Dec. 6, 1927.

J. SACHS 1,651,554

TEST CONTACT

Filed Feb. 15, 1924

INVENTOR
Joseph Sachs, by
Harry R. Williams
atty.

Patented Dec. 6, 1927.

1,651,554

UNITED STATES PATENT OFFICE.

JOSEPH SACHS, OF HARTFORD, CONNECTICUT.

TEST CONTACT.

Application filed February 15, 1924. Serial No. 693,011.

This invention relates to the test contacts such as are used in electric meter service appliances and other electrical appurtenances when it is desired to provide any of the conducting parts, such as the circuit connections, switch blades, fuse receptacle contacts or terminals, with means to facilitate the connection of the clips or clamps attached to the ends of testing instrument leads, by-passes and jumpers, so that these temporary conductors can be readily connected to the desired conductors of the permanent appliance. Commonly the clips at the ends of the test instrument leads or temporary conductors are of the spring jaw type, that is, they have spring closed jaws which are opened to permit the placing of the jaws on the test contacts and then allowed to close and clip the test contacts by the pressure of the springs which force the jaws together. Unless the test leads are carefully separated and kept free from all strain or pull considerable trouble is experienced in making tests, due to the pulling off from the test contacts of the clips.

The object of the present invention is to provide an improved test contact of simple and inexpensive construction which is so designed that when a clip is once attached it cannot be detached unless the clip jaws are intentionally separated.

In carrying out the invention the test contact is formed of sheet metal and it may be integral with or attached to a conductor of the appliance. The test contact is formed at its outer or projecting end with integral teeth bent in opposite directions at angles to the main body thereof in such manner that when a clip is attached to the contact the teeth engage the inside of the clip jaws and prevent the clip from being accidentally pulled off from the contact.

Figure 1:
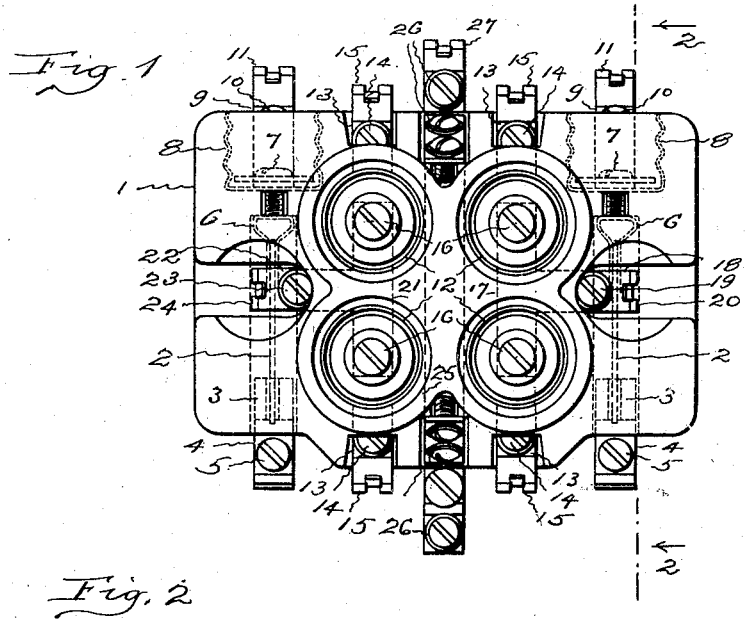
Figure 2:
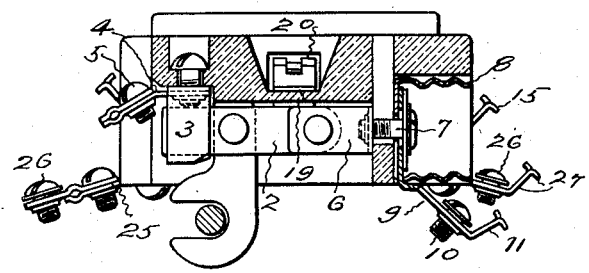
Figure 4:
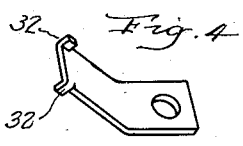
Figure 3:
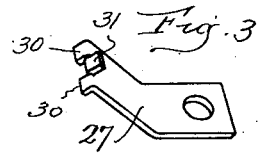
Figure 5:
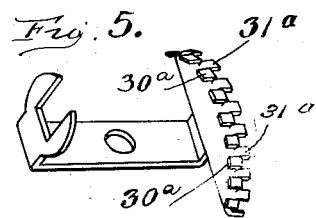
Figure 6:
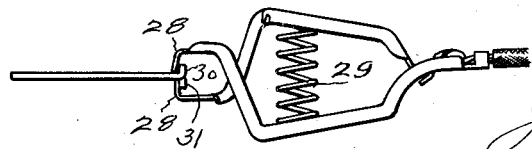

In the accompanying drawings Fig. 1 shows a plan of a meter service block provided with test contacts constructed according to this invention. Fig. 2 is a section on the plane indicated by the dotted line 2—2 on Fig. 1. Fig. 3 shows a perspective view of a detached contact. Fig. 4 shows a view of a contact with teeth of a different design. Fig. 5 shows a contact with teeth as they may be arranged for the attachment of a plurality of test lead clips. Fig. 6 shows a clip of common type attached to a test contact as in use.

The block which I have shown in Figs. 1 and 2 for the purposes of illustrating the invention does not of itself or as an entirety constitute any part of the invention. The features of invention included in the block as shown are presented in my copending applications for protected electric meter service appurtenances filed respectively August 2, 1922, and February 15, 1924, and serially numbered respectively, 579,178 and 693,010. The block illustrated has a base 1 which is a unitary piece of insulation, and it has connections for a three-wire service circuit with the two outside wires fused, and four two-wire branch circuits with a fuse in each branch. In a recess in the back face of the base are switch blades 2, the swinging ends of which are adapted to engage with and disengage from clips 3 that are connected to strips 4 provided with binding screws 5 by means of which the ends of the outside wires of the service circuit may be connected with the switch. The outer ends of the switch blades are pivoted to brackets 6 that are engaged by screws 7 the heads of which provide the center contacts of screw plug sockets in the upper edge of the base. The threaded metallic shells 8 of these sockets are adapted to receive the common form of screw plug fuse, and they are connected with strips 9 that have binding screws 10 adapted to fasten the leads to the current windings of the meter with which the block is used. At the outer ends of these strips are test contacts 11.

In the front face of the base are sockets containing screw threaded shells 12 adapted to receive common screw plug fuses. Each of these shells is connected with a conducting strip 13 which is provided with a binding screw 14 by which one end of the branch circuit wires may be fastened. At the outer ends of these strips are test contacts 15. In the center of each socket is the usual contact 16 adapted to be engaged by the center terminal of a screw plug fuse. The center contacts of the two sockets on one side are connected by a conductor 17 which is electrically connected with a lug 18 having a binding screw 19 and test contact 20. On the other side the center contacts of the two sockets are connected by a strip 21 which is in electrical contact with a lug 22 that has a binding screw 23 and a test contact 24. The screws 19 and 23 are adapted to fasten leads from the meter current coils. Extending across the center of the back of the base is a conducting strip 25 provided with binding screws 26 by which the return wires of the branches and the neutral wire of the main line are adapted to be fastened. At the end of the neutral strip 25 is a test contact 27. Other test contacts may be provided as desired.

The test contacts 11, 15, 20, 24 and 27 are designed to facilitate the attachment of the clips or clamps at the ends of by-pass jumpers or of leads from testing instruments. The test clips commonly used are of the type shown in Fig. 6 having a pair of jaws 28 normally pressed closed by a spring 29 which forces the jaws tightly together.

The test contacts which can be integral with the conducting parts on the block or pieces adapted to be fastened thereto, are formed of sheet metal and each of them is provided at its outer end with teeth projecting angularly in opposite directions beyond the opposed faces of the main body of the contact. As shown in Fig. 3 the outer end portions of the contacts are slitted and the parts adjacent the slits are bent in opposite directions at angles to the main body of the contact to form teeth. The said end portion may be slitted longitudinally and the adjacent parts bent oppositely to form teeth 30, 30 and 31 as shown in Fig. 3, or the said end portion may be slitted transversely and the adjacent parts bent oppositely outward to form teeth 32, 32 as shown in Fig. 4.

It will be observed that in Figs. 1 to 3 the teeth 30, 30 and 31 are shown as being positioned approximately at right angles to the main body of the contact. I do not limit myself as to the location of the teeth exactly at right angles, but they must be at sufficient angles to prevent the removal of a connection clip therefrom by a direct longitudinal pull thereon.

When the end portion of the contact is slitted longitudinally as shown in Fig. 3 there are preferably provided at least two slits so that there may be at least two teeth 30, 30 bent in one direction and located immediately adjacent the opposite edges of a tooth 31 bent in the other direction. Ordinarily it is sufficient to provide three teeth 30, 30 and 31 as shown specifically in Fig. 3. It will be observed that with the three tooth construction the single tooth 31 at one side is at the center and the two teeth 30, 30 at the other side are equidistant from the center, thus providing a symmetrical construction and avoiding any tendency to twist or distort the test clip when a pull is exerted thereon.

Should it be desirable to have the test contacts adapted for the attachment of more than one clip they may be extended as shown in Fig. 5 and provided with a considerable number of teeth 30$^a$, 30$^a$, and 31$^a$, 31$^a$ that extend respectively in opposite directions from the end of the strip.

When a clip is to be attached to a test contact its jaws are opened by pressing together the sides of the clip and in its open position the jaws are passed over the toothed end of the test contact. Pressure on the clip is then relieved and the force of the spring allowed to close the jaws upon the contact. A clip attached in this manner to a contact which forms the subject of this invention cannot be pulled or drawn from the contact accidentally. It can only be displaced by properly manipulating it and opening the jaws.

The invention claimed is:—

1. For use with a meter service appliance, a sheet metal test contact having at its outer end integral teeth bent in opposite directions at angles to the main body of the contact and positioned at sufficient angles to the said body to prevent removal of a connection clip therefrom by a direct longitudinal pull.

2. For use with a meter service appliance, a sheet metal test contact having its outer end portion slitted longitudinally to provide integral teeth which are bent in opposite directions at angles to the main body of the contact, there being two teeth bent in one direction and respectively located immediately adjacent the opposite edges of a tooth bent in the other direction.

JOSEPH SACHS.